(12) United States Patent
Gore et al.

(10) Patent No.: US 6,387,994 B1
(45) Date of Patent: May 14, 2002

(54) COMBINATION OF A SOLID SOLVENT AND A MELT-PROCESSIBLE BLOCK COPOLYMER

(75) Inventors: Scott Gore, Newark; Holly Blake, Bear, both of DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 0 days.

(21) Appl. No.: 09/433,921

(22) Filed: Nov. 4, 1999

(51) Int. Cl.[7] .............................. C08J 3/00; C08K 3/20; C08K 5/16; C08L 75/00
(52) U.S. Cl. ................. 524/198; 524/186; 524/191; 524/210; 524/227; 524/589; 524/590; 524/591
(58) Field of Search ................................ 524/589, 590, 524/591, 186, 198, 210, 227, 191

(56) References Cited

U.S. PATENT DOCUMENTS

| | | | |
|---|---|---|---|
| 4,434,262 A | 2/1984 | Buckley et al. | 524/237 |
| 4,843,117 A | 6/1989 | Chung | 524/173 |
| 5,157,068 A | 10/1992 | Chung | 524/318 |
| 5,209,969 A | 5/1993 | Crowther | 428/317 |
| 5,334,643 A | 8/1994 | Gage | 524/232 |

FOREIGN PATENT DOCUMENTS

| | | |
|---|---|---|
| DE | 1594322 | 7/1970 |
| EP | 450 513 | 10/1991 |

*Primary Examiner*—Patrick D. Niland
(74) *Attorney, Agent, or Firm*—Allan M. Wheatcraft

(57) ABSTRACT

A new class of solid solvents selected from adipamides, bisacetamides, biscarbamates, and dibenzamides has been found effective to reduce the melt viscosity of certain block copolymers while not substantially adversely affecting the mechanical properties of the block copolymer when both block copolymer and solid solvent are below their melt temperature. The block copolymers can be polyether-polyurethane block copolymers, polyester-polyurethane block copolymers, polyester-polyether block copolymers, polyamide polyether, or polyamide polyester. The combination is especially useful as an adhesive, as the adhesive component for fabric laminates or as the adhesive for seam sealing tapes.

16 Claims, 1 Drawing Sheet

COMBINATION OF A SOLID SOLVENT AND A MELT-PROCESSIBLE BLOCK COPOLYMER

FIELD OF THE INVENTION

This invention provides a new class of solid solvent viscosity depressants for use in preparing blends with block copolymers such as polyether-polyurethane block copolymers, polyester-polyurethane block copolymers, or other block copolymers described below. The blends are useful as adhesives.

BACKGROUND OF THE INVENTION

Polymers of all types have proven to be very useful materials in modern society, and many different methods have been developed in order to shape them into useful forms. One of the simplest methods is thermal processing, where a polymer is heated to a temperature at which it flows, is then shaped into its final form by processing machinery, and then is allowed to cool and solidify. This method is widely used because it efficiently uses the polymer material, and generally does not produce large waste streams which must be properly disposed of. However, some materials are difficult to process thermally. The polymer may degrade undesirably at the processing temperature, and yet lowering the processing temperature is not always practical because the polymer viscosity becomes too high for proper processing.

Another method of processing polymers is to make solutions by blending a suitable liquid solvent with the polymer. The solution viscosity is often low enough that the processing can be done at room temperature, although processing of heated solutions is not uncommon. In any case, lower viscosities can be obtained at lower processing temperatures than for the pure polymer, which eliminates problems due to degradation at high processing temperatures. Solvent processing does have many drawbacks, however. The solutions are often made from solvents which are highly flammable and/or present health hazards via inhalation and skin contact. The solvents must be removed and properly disposed of, which is often an involved and expensive process, especially as governmental regulations concerning airborne emissions have become increasingly stringent. Solution processing is usually limited to forming the polymer into thin films.

It is important to reduce a polymer's melt viscosity in some instances, for example, where a polymer has such a high viscosity that it is difficult to extrude or mold. However, sometimes the viscosity cannot be lowered by increasing the temperature because of decomposition concerns, and the disadvantages of traditional liquid solvents make their use unacceptable.

A more recent method of processing polymers is with the aid of solid solvents. Solid solvents are additives which act as a solvent for a particular polymer above a certain temperature A polymer/additive solution forms in which the melt viscosity of the solution is lower than that of the polymer itself. Thus solid solvents are used where it is desired to lower the melt viscosity and/or processing temperature of the polymer. On the other hand, below that temperature, the solid solvent precipitates out of the polymer and becomes a filler. This eliminates the need for solvent removal that is associated with traditional liquid solvents. Solid solvents are generally low molecular weight crystalline compounds. In operation, a properly functioning solid solvent additive melts at or below the processing temperature, and is soluble such that it reduces the viscosity of the polymer/additive blend to a lower level than that of the base polymer. At use temperature of the final article, the solid solvent functions as a filler, not as a plasticizer. For example, if increased softness or tack are not desired in the final article, the use of a solid solvent avoids exacerbating these undesirable properties in comparison to the base polymer. Solid solvents are different from traditional liquid solvents or lubricants. A traditional liquid solvent adversely affects the mechanical properties of a polymer unless it is removed. A lubricant is not soluble in the base polymer and does not reduce viscosity at low additive levels.

Some classes of solid solvents suitable for homopolymers and random copolymers polymers are known. For example Chung U.S. Pat. No. 5,157,068 teaches that low molecular weight crystalline carboxylic acids and their derivatives act as solid solvents to improve the processibility of vinyl chloride polymers; and in U.S. Pat. No. 4,843,117, Chung teaches that dimethyl sulfone does the same for vinylidene chloride polymers. Buckley, U.S. Pat. No. 4,434,262 teaches an improved melt-processible blend of a polyolefin or polyester in which a solid solvent is present that is N, N'-bis(p-methoxybenzylidene)-alpha, alpha'-bi-p-toluidine; p-methoxycinnamic acid; N, N'-bis(4-octyloxybenzylidene)-p-phenylenediamine and lithium stearate. However, none of the solid solvents taught are suitable for block copolymers for one or more of the following reasons: Ineffective viscosity depression, excessive deterioration of physical properties, reactivity with the polymer, and excessive volatility at processing temperatures.

SUMMARY OF THE INVENTION

A new class of solid solvents has now been found, which properly function as solid solvents when blended into block copolymers. This new class of solid solvents helps overcome some of the dissadvantages traditionally associated with the thermal processing of block copolymers, and yet has little detrimental affect on physical properties at use temperatures. A particularly useful aspect is when the blend is used as an adhesive and the substrate to which the adhesive is to be applied has pores, cavities, or other surface irregularities. This is because with a lower melt viscosity during the application process, the adhesive can more easily flow into the confined spaces of the substrate material. Examples of processes which benefit from the adhesives made from the blends of this invention include lamination of fabrics and sealing of fabric seams.

It is a purpose of this invention to provide a new class of solid solvents for melt-processible block copolymers, such as polyurethanes, e.g. polyether-polyurethane block copolymers or polyester-polyurethane block copolymers, polyester-polyether block copolymers, polyamide-polyether block copolymers, and polyamide-polyester block copolymers.

It is another purpose to provide a new class of solid solvents for adhesives containing the previously mentioned block copolymers.

It is still another purpose to provide seam tapes containing solid solvents for sealing fabric seams.

It is still another purpose to provide protective fabrics with seams sealed with tape containing the new class of solid solvents in certain polymers. By protective fabric is meant a fabric that protects against the adverse influence of liquids, gases, viruses, or the like.

In one aspect, the compounds that have been found effective as solid solvents for block copolymers have a molecular weight less than 600, contain two functional groups selected from either amide or carbamate groups, and have at least two aromatic rings in the structure. Such solid solvents for block copolymers, hereafter referred to as block-copolymer solid solvents, include adipamides, bisacetamides, biscarbamates, and dibenzamides.

In another aspect, the blockcopolymer solid solvents can be represented by the formula:

R"-X-R'-X-R'"

wherein:
where R" and R'" can be the same or different and are selected from alkyl of 1–6 carbons or phenyl; each X is the same and is selected from divalent amide or divalent carbamate; R' is alkylene of 1–6 carbons, methylene diphenylene or oxydiphenylene. And when R" and R'" are alkyl, R' is oxydiphenylene or methylene diphenylene.

It is understood that the aromatic groups may contain common substituents such as alkyl, halo, or the like, so long as the desired properties of the block copolymer are not significantly reduced.

Block copolymers exhibit an unusual combination of toughness and flexibility which has been attributed to a distinct 2-phase morphology at use temperatures. The molecules of the block copolymer consist of 2 types of structures; a stiff section known as the hard segment, and a flexible section known as the soft segment. The hard segment often has high aromatic ring content, and has either a crystalline melting point or glass transition temperature which is higher than the use temperature. The soft segment is usually more aliphatic in nature, and usually has an amorphous structure with a glass transition temperature lower than the use temperature. Whether or not the block copolymer contains aromatic or aliphatic segments, the hard segment is typically in a crystalline or glassy state, while the soft segment is typically in a rubbery state at use temperature. Because these 2 types of structures are insoluble with each other at use temperature, they are phase separated to form different domains. When melt processing block copolymers, the order of the phase-separated domains is reduced, and they may become mixed to a certain degree. However, complete liquid-type randomization of the molecules is difficult to achieve because of the strong thermodynamic insolubility of the 2 types of intra-molecular structures, and even in the melt, block copolymers often continue to display some inter- and intra-molecular ordering. Specifically, this behavior may be attributed to the comparatively low entropy of solubilization caused by the long lengths of the hard and soft segments. As a result, block copolymers usually have comparatively high melt-processing viscosities compared to homopolymers and randomized copolymers of comparable molecular weight.

Solid solvents have now been found that function exceptionally well in block copolymers when the solid solvent has a specific combination of molecular features; 2 or more aromatic rings, 2 amide or carbamate groups, a certain degree of symmetry, and short molecular length. Such molecules show sharply changing solubility characteristics with changes in temperature. From a thermodynamic point of view, both enthalpy and entropy components can be looked at to see how the molecular features of these block-copolymer solid solvents affect solubility in the block copolymer. The combination of strong hydrogen-bonding functionalities, aromatic rings, and general symmetry of the molecules result in a very strong tendency to form crystalline structures. In fact, it is sometimes necessary to reduce the symmetry of the molecules somewhat so that the crystalline melting point is not too high. In any case, if a melted blend of this invention is cooled to use temperature, the enthalpy of crystallization component for the block-copolymer solid solvent is so strong that that it overcomes decreases in the blend's entropy, and the block-copolymer solid solvent becomes insoluble and precipitates out of the block copolymer. Now, the case will be examined when the blend is heated above the melting point of the block-copolymer solid solvent and the melting point/glass transition of the hard segment of the block copolymer. It might be noticed that the block-copolymer solid solvents of this invention often structurally resemble the hard segments of many block copolymers. Since the hard segments and soft segments of block copolymers have difficulty solubilizing with one another, even at high temperatures, one might wonder if these solid solvents will actually solubilize with both types of intra-molecular structures, rather than simply favoring solubilization with the hard segment. There is, however, a key difference between these block-copolymer solid solvents and the hard segment, and that is molecular length. As a result, unlike the hard segment, or the soft segment for that matter, these block-copolymer solid solvents have a very high entropy component with respect to solubilization. Since entropy plays an increasing role in solubilization as temperature goes higher, these block-copolymer solid solvents are able to solubilize with both types of block-copolymer segments at processing temperatures. Therefore, these block-copolymer solid solvents help to strongly reduce melt viscosity because, at elevated temperatures, they diminish residual inter- and intra-molecular ordering in the block-copolymer melt by serving as a solubilizing agent for both sections of the block-copolymer molecule.

Additionally, the structures of the block-copolymer solid solvents of this invention result in other highly desirable attributes besides viscosity depression. They have low volatility, which makes them environmentally friendly for processing temperatures of 200° C. and higher, and the final article will not suffer long-term shrinkage caused by sublimation or evaporation. Also, these block-copolymer solid solvents are not significantly extracted by liquid solvents which do not also dissolve the base block copolymer.

Preferred block-copolymer solid solvents for block copolymers are:

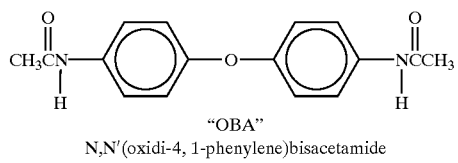

"OBA"
N,N'(oxidi-4, 1-phenylene)bisacetamide

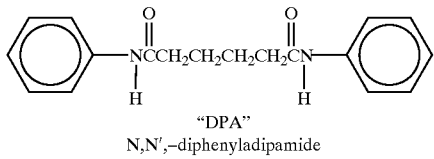

"DPA"
N,N',–diphenyladipamide

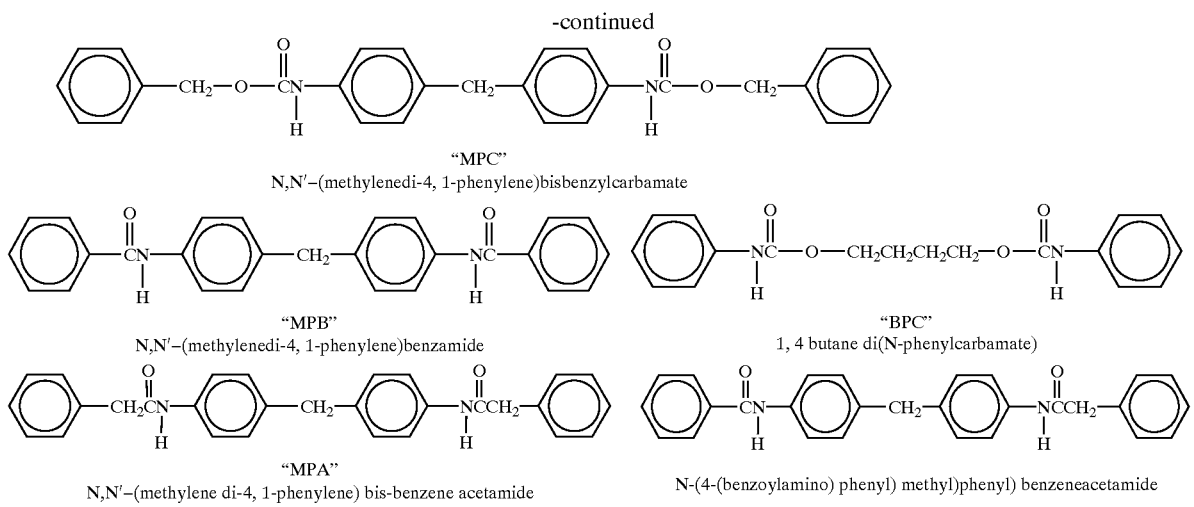

The base block copolymer is preferably a polyester-polyether block copolymer, or a polyurethane block copolymer, especially a polyether-polyurethane or polyester-polyurethane. A preferred polyurethane is comprised of units of methylene diphenyldiisocyanate/polyoxytetramethylene glycol/1,4-butanediol.

Whichever block-copolymer solid solvent is used, it must be chosen to begin to melt into the base block copolymer below the processing temperature of the block-copolymer/additive blend employed, and be chosen to precipitate out of the melt at temperatures above the block-copolymer/additive blend's use temperature.

In one aspect, the invention is a blend of a block-copolymer solid solvent described above and the base block copolymer in which the solid solvent is present in an amount of between 0.2% and 20% by weight, preferably between 0.2% and 5% by weight, and most preferably between 0.5% and 2% by weight of blend.

In other aspects, the blend will be in the form of a sheet or a tape or coating on a substrate, such as a textile. In an especially preferred embodiment, the blend will form a seam tape for sealing fabric seams.

The blend can be used in a number of forms in articles of clothing. By clothing is meant any wearing apparel including shirts, trousers, sweaters, coats, hats socks, shoes, gloves and the like.

DEFINITIONS

Figure 1:
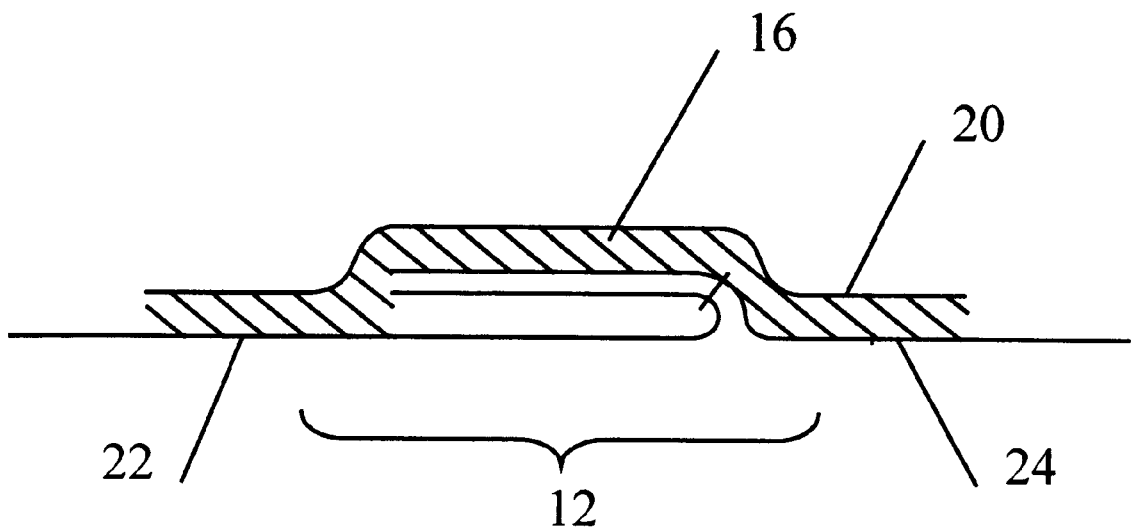
FIG. 1 is a cross section of a typical seam sealed with seam tape.

"Blend" means a composition in which two or more ingredients have been mixed.

"Processing temperature" means a temperature to which a polymer or polymer/additive blend is heated in order to melt form it for a particular purpose.

"Use temperature" means a temperature to which the final article incorporating the polymer/additive blend is exposed to during normal usage of the final article.

DETAILED DESCRIPTION OF THE INVENTION

An effective block-copolymer solid solvent should satisfy several requirements. First, thermal processing of block copolymers, as commercially practiced, is often done at melt temperatures ranging from 150° C. to 300° C., depending on the block copolymer employed. Therefore, the block-copolymer solid solvent should give viscosity depression in the range of processing temperatures that are typically encountered in a manufacturing environment. Because the thermal processing operation is usually done on an open factory floor, the block-copolymer solid solvent should preferably also have low volatility and low hazard under typical processing conditions.

Second, the block copolymer solid solvent system in sheet form may be flexed a great deal as it is being used. Polymers which have a combination of low modulus of elasticity (stiffness) and high tensile strength are particularly durable to flexing, and block copolymers are especially notable for having these properties. As a result, block copolymers are often chosen for use in applications in which the final article must endure a great deal of flexing. This means that the block-copolymer solid solvent should not deteriorate the desired properties of the base block copolymer. That is, it should not exhibit substantial increase in modulus of elasticity, and substantial decrease in tensile strength when incorporated into the block copolymer.

The block-copolymer solid-solvent additives disclosed in this invention are uniquely suitable for incorporating into melt-processible block copolymers, such as polyether-polyurethane block copolymers, polyester-polyurethane block copolymers, polyester-polyether block copolymers, polyamide-polyether block copolymers, and polyamide-polyester block copolymers.

An example of the usefulness of the block-copolymer/additive blends of this invention can be found in the waterproof garment industry. Waterproof garments are made of a number of special fabrics that include a protective waterproof-barrier layer, and may include other layers such as backing or face fabrics. When fabrics used to make waterproof garments are sewn together, the resulting seams are not waterproof. The span between the stitch points, and also the needle holes are subject water leakage. Because of this, many waterproof fabric applications employ seam seals to continue the waterproof protection of the fabric across the seam of the final article.

As shown in FIG. 1, articles are assembled from these fabrics by sewing panels of waterproof fabric 22, 24 into a shape such as a garment. The joints between the fabric panels and other disruptions of the waterproof barrier layer need to be sealed so that the sealed seam provides waterproof protection comparable to the waterproof fabric. This generally is accomplished by applying a tape over the seam, as shown in FIG. 1. Typically, a tape will have a layer of adhesive 16, and a backing 20. The adhesive is a melt-processible polymer and is softened by hot air. The melted layer of adhesive is applied to the seam 12.

The ability to obtain a good seal is a function of the melt viscosity of the adhesive, because the lower the viscosity, the greater the ease with which the adhesive will flow into and block the open pathways through which water may leak. Therefore, it is desirable to have a low melt viscosity in order to achieve an acceptably sealed seam. On the other hand, strength of the seal is a function of the molecular weight of the polymer adhesive, since higher molecular weight generally correlates to higher strength. However, viscosity is also a function of molecular weight, and viscosity generally decreases as molecular weight decreases. Therefore, it is often difficult to select a polymer with an appropriate molecular weight low enough to have low viscosity and get an initially sealed seam, but high enough to have high tensile strength and give a acceptably durable sealed seam. The block-copolymer solid-solvent additives of this invention allow for the control of these interdependent properties to be separated.

Mathematically, the concept of viscosity being reduced in greater proportion than any reduction in tensile strength can be quantified by the following formula:

$$\text{Normalized } TS/Visc \text{ Ratio} = \frac{(TS \text{ of resin with additive})}{(Visc \text{ of resin additive})} \times \frac{(Visc \text{ base resin})}{(TS \text{ base resin})}$$

where TS=Tensile Strength @ room temperature and Visc=viscosity@ processing temperature. When the block-copolymer solid-solvent level in the polymer is 0, the Normalized TS/Visc ratio is 1. If the Normalized TS/Visc ratio is greater than 1 when a solid solvent has been added, then the viscosity reduction caused by the solid solvent has been proportionally greater than any reduction in tensile strength that may have been caused by the solid solvent. If the Normalized TS/Viscosity ratio is less than 1, then the solid solvent adversely affects the polymer, because it causes comparatively big loses in tensile strength and small reductions in viscosity. Preferably the ratio is greater than 1.3, more preferably greater than 2, and can be greater than 5 with an upper limit of 200 or more.

To make the blends of this invention, block copolymer may be blended with the solid solvent using conventional rubber or plastic compounding equipment, such as a 2-roll mill, 2-rotor internal mixer, or extruder. The temperature of the compounding equipment should be set to properly process the base copolymer, and then the copolymer and additive are metered into the compounding equipment in the desired proportions.

To prepare a tape of the blend, the blend is extruded, with the extrudate being applied to a sealing backer, and then slit into strips of seam sealing tape. Seams can be sealed with the tape using a conventional procedure such as a seam sealing machine and/or cross over press. In a preferred embodiment, the block-copolymer solid solvent is incorporated into a melt-processible block-copolymer polyurethane. These block-copolymer solid solvents function as viscosity depressants at seam sealing temperatures, and as non-plasticizing fillers at normal use temperatures. Seam tapes made with such additives in their block-copolymer polyurethane layer in the amount of 0.2% to 20% by weight allow for the seam sealing of waterproof fabrics at higher speeds, and/or cooler temperatures, onto thicker and/or denser fabrics, than seam tapes without said block-copolymer solid solvent. Additionally, seams sealed with seam tape incorporating such a block-copolymer solid solvent are more durable and have a longer life, even when sealed at higher speeds than conventional seam tapes.

The blends of the invention can be used as adhesives to laminate layers together at lower viscosities than is otherwise possible. For example, a fabric can be made by laminating a polymer and a textile using the blend of the invention as an adhesive. Also, instead of sewn seams, the blends of this invention can be used to join panels together to form adhesive seams.

Test Procedures

Tensile Strength

A sample of base block copolymer or blockcopolymer/solid solvent blend was dried overnight in a Precision Scientific vacuum oven at 70° C. and 1 torr vacuum.

The base block copolymer or block-copolymer blend was then placed between 2 sheets of Enterprise Tape Company CS2 P1000/T7030 release paper. The release paper—block copolymer—release paper or release paper—block copolymer blend—release paper sandwich was placed between the plates of a Testing Machines, Inc. 8"×8"×0.075" slab mold. The slab mold and its contents were then inserted into the platens of a PHI 25 ton hydraulic press preheated to 160° C. The pressure was increased to 20 tons ram force over a 5 minute period. The temperature and pressure were held for 10 minutes. After 10 minutes, the platens were cooled by means of water flowing through cooling channels. When the temperature of the platens was less than 30° C., the pressure was released. The slab mold was removed from the press, the block copolymer or blend sheet was stripped out of the mold cavity, and the release paper was removed from the sheet.

Tensile specimens were cut from the molded sheets using an ASTM D638 tensile die #5, supplied by Testing Machines, Inc. Tensile properties of the tensile specimens were measure using an Instron Corporation model 5500 tensile testing machine, equipped with a 200 lb load cell and serrated grips. The testing protocol was according to ASTM D638, with a crosshead speed of 1 in/min and the room temperature nominally 73° F. The reported results are the averages for 8 tensile specimen pulls from each of the molded sheets.

Viscosity

A sample of base block copolymer or block-copolymer/solid solvent blend taken from the molded sheet was dried overnight in a Precision Scientific vacuum oven at 70° C. and 1 torr vacuum.

Viscosity of the block copolymer or blend was measured using a Rheometric Scientific ARES-LS-M rheometer. The rheometer was equipped with parallel plates 25 mm in diameter, and the motor set to the dynamic (occillatory) mode at 10 sec$^{-1}$. Pieces of the dried block copolymer or block-copolymer/additive blend were placed on the lower plate, and melted using a heat gun. More pieces were added as necessary until the lower plate was completely covered with molten block copolymer or blend. The upper plate was lowered and brought into contact with the molten block copolymer or blend. The upper plate was adjusted so that the gap between the upper and lower plates was 1.5 to 2.0 mm. The excess molten block copolymer or block-copolymer/additive blend displaced from between the plates was trimmed off of the plate edges. The rheometer's environmental chamber was closed around the plates, and a nitrogen purge was started. The test sample was cooled to 50° C. The temperature was equilibrated an additional 5 minutes after the sample thermocouple reached the test temperature, and then a viscosity measurement was taken. The temperature was increased in 20° C. increments up to 250° C., with the sample being temperature equilibrated and measurements being taken at each temperature interval. The viscosities and their associated temperatures reported in Table 2 were those that achieved the optimal Normalized TS/Viscosity ratio according to this viscosity measurement method.

Suter Test

To determine whether a protective fabric and its sewn seam were waterproof, the Suter test procedure was used. The procedure provides a low pressure challenge to the sample being tested by forcing water against one side of the test sample and observing the other side for indication that water has penetrated through the sample.

The test specimens were clamped and sealed between rubber gaskets in a fixture that held the specimens, and water was applied to an area of the specimen three inches (7.62 cm) in diameter. The water was applied under air pressure of 1 psig to one side of the specimen. In testing a sealed seam, water is applied to the face side of the laminate and the sealing backer is observed for leaks.

The other side of the sample was observed visually for any signs of water appearing on the side for three minutes. If no water was observed, the sample passed the test and was considered waterproof.

EXAMPLES

Example A

Preparation of DPA: N,N'-diphenyl Adipamide

1) A 1000 ml 3-necked flask was equipped with a motor driven stirrer and N2 purge.
2) 176.539 g of aniline (99.5%+ACS reagent, Aldrich Chemical Company, Inc., Catalog No. 24,228-4) and 450 ml of toluene (99%, Aldrich, Catalog No. 17,996-5) were added to the flask.
3) With the aniline/toluene mixture being stirred, a dropwise addition of 99.32 g of adipoyl chloride (98%, Aldrich, Catalog No. 16,521-2) was started. The reaction was vigorous and HCl offgassing could be seen. The pasty mixture was stirred for 2 hours after the adipoyl chloride addition was complete.
4) The paste was poured from the flask into a vacuum filtration device, and the toluene drawn off by vacuum filtration.
5) The filter cake was rinsed with 250 ml of hot acetone (Certified ACS, Fisher, Catalog No. A18-20) and vacuum filtered. This was done 3 times.
6) The filter cake was rinsed with 4 liters of deionized water, and vacuum filtered.
7) The filter cake was dried overnight at 70° C. in an oven.
8) 137.149 g of N,N'-diphenyladipamide were recovered.
9) The recovered product had a melting point range of 238–240° C., as determined by a capillary tube melting point device.

Example B

Preparation of MPC: N,N'-(methylenedi-4,1-phenylene) bisbenzylcarbamate

1) A 3000 ml 3-necked flask was equipped with a motor driven stirrer and N2 purge.
2) 1000 ml of dimethyl formamide (99%+Anhydrous, Aldrich, Catalog No. 22,705-6) solvent and 467.93 g of benzyl alcohol (99.8% Anhydrous, Aldrich, Catalog No. 30,519-7) were added to the flask.
3) 523.39 g of 4,4'-methylenebis(phenylisocyanate) (MDI) (Rubinate 1920, ICI Americas, Inc.) was added to the flask over a 20 minutes period.
4) 1 hour after completion of the MDI addition the exotherm had subsided and the flask was slightly warm to the touch. Large amounts of precipitate were visible. 10 drops of stannous octoate (DABCO T-9 Catalyst, Air Products and Chemicals, Inc.) were added.
5) Gentle warming of the flask with a heat gun was started; to 86° C.
6) 1 hour and 45 minutes later, the heating was stopped.
7) The flask was allowed to cool for 30 minutes.
8) In order to cause precipitation, 750 ml of deionized water were slowly added to the flask while undergoing vigorous stirring.
9) The contents of the flask were poured into 1 liter of deionized water, and vacuum filtered.
10) The filter cake was dried for 3 days in an oven at 70° C.
11) 943.97 g of product were recovered.
12) The recovered product had a melting point range of 190–193° C., as determined by a capillary tube melting point device.

Example C

Preparation of MPB: N,N'-(methylenedi-4,1-phenylene) bisbenzamide

1) A round 3000 ml 3-necked flask was equipped with a motor driven stirrer and N2 purge.
2) 608.19 g (4.326 moles) of benzoyl chloride (99% ACS reagent, Aldrich, Catalog No. 25,995-0) were added to the flask.
3) 1 L of anhydrous (water<0.005%) N-methyl pyrrolidone (99.5% Anhydrous, Aldrich Catalog No. 32,863-4) solvent was added to the flask.
4) Stirring was started and the flask was warmed to approximately 70° C. by means of a heat gun.
5) In small portions, 420.31 g (2.120 moles) of methylene dianiline (97%, Aldrich Catalog No. 13,245-4) were added to the flask over approximately 30 minutes).
6) 30 minutes after the completion of the methylene dianiline addition, a precipitate began coming out of the solution.
7) The temperature of the flask was raised using the heat gun. When the solution temperature reached 116° C., all the precipitate had solubilized back into the solution. The heat gun was turned off.
8) When the flask cooled to 81° C., precipitate began to reappear. The total time elapsed since the completion of the methylene dianiline addition was 3.5 hours.
9) The product was completely precipitated from solution by adding 1 L of water to the flask in a drop-wise fashion over 15 minutes. The precipitate formed fine particles.
10) In order to neutralize the HCl that was generated during the reaction, a total of 170.1 g of sodium hydroxide (97%, Aldrich Catalog No. 36,717-6) were added to the flask in small portions.
11) 5 drops of Palmolive brand liquid dish detergent were added to the flask.
12) The hot slurry was poured from the flask into a 3-liter vacuum filter equipped with medium grade filter paper, and the N-methyl pyrrolidone/water mixture was drawn off by vacuum filtration.
13) The product was washed/vacuum filtered with 2×1 L of water.
14) The filter cake of the product was coarsely dried overnight in an oven at 90° C.

15) The product was then completely dried in a vacuum oven at 70° C. for overnight.

16) 826.96 g (2.037 moles) of N,N'-(methylenedi-4,1-phenylene) bis-benzamide were recovered in the form of a fine, white powder.

17) The recovered product had a melting point range of 247–249° C., as determined by a capillary tube melting point device.

Example D
Preparation of BPC: 1,4-Butane-di(N-phenylcarbamate)

1) A round 3000 ml 3-necked flask was equipped with a motor driven stirrer, N2 purge.

2) 203.53 g (1.7086 moles) of phenylisocyanate (98%+, Aldrich Catalog No. 18,535-3) were added to the flask.

3) 750 ml of N-methyl pyrrolidone solvent were added to the flask.

4) With stirring 77.53 g (0.8604 moles) of 1,4-butanediol (BASF) were added drop-wise to the flask.

5) The flask was allowed to sit overnight without stirring.

6) With stirring, the product was completely precipitated from solution by adding 1 L of water to the flask in a drop-wise fashion over 15 minutes. The precipitate formed fine particles.

7) 3 drops of Palmolive brand liquid dish detergent were added to the flask.

8) The slurry was poured from the flask into a 3-liter vacuum filter equipped with medium grade filter paper, and the N-methyl pyrrolidone/water mixture was drawn off by vacuum filtration.

9) The product was washed/vacuum filtered with 2×1 L of water.

10) The filter cake of the product was coarsely dried overnight in an oven at 80° C.

11) The product was then completely dried in a vacuum oven at 70° C. for overnight.

12) 270.33 g (0.82327 moles) of 1,4-Butanedi(N-phenylcarbamate) were recovered in the form of a fine, white powder.

13) The recovered product had a melting point range of 178–180° C., as determined by a capillary tube melting point device.

Example E
Preparation of MPA: N,N'-(methylenedi-4,1-phenylene) bis-benzenacetamide 1) A round 3000 ml 3-necked flask was equipped with a motor driven stirrer, N2 purge.

2) 86.41 g (0.5589 moles) of phenylacetyl chloride (98%, Aldrich P1,675-3) were added to the flask.

3) 0.25 L of N-methyl pyrrolidone solvent were added to the flask.

4) 55.11 g (0.2776 moles) of methylene dianiline were added to the flask all at once.

5) 30 minutes after the completion of the methylene dianiline addition, the temperature of the flask was raised using the heat gun to 94° C.

6) 3 hours and 35 minutes after the addition of methylene dianiline, the product was completely precipitated from solution by adding 0.3 L of water to the flask in a drop-wise fashion. The precipitate formed fine particles.

7) In order to neutralize the HCl that was generated during the reaction, a total of 31.35 g of potassium hydroxide were added to the flask in small portions.

8) 5 drops of Palmolive brand liquid dish detergent were added to the flask.

9) The hot slurry was poured from the flask into a 3-liter vacuum filter equipped with medium grade filter paper, and the N-methyl pyrrolidone/water mixture was drawn off by vacuum filtration.

10) The product was washed/vacuum filtered with 4×0.3 L of water.

11) The filter cake of the product was dried overnight in an oven at 105° C.

12) 116.08 g of N,N'-(methylenedi-4,1-phenylene) bis-benzenacetamide were recovered in the form of a fine, white powder.

13) The recovered product had a melting point range of 215–218° C., as determined by a capillary tube melting point device.

Example F
Preparation of MPBA, a mixture of:
N,N'-(methylenedi-4,1-phenylene) bis-benzamide
N,N'-(methylenedi-4,1-phenylene) bis-benzenacetamide
N-(4-((benzoylamino)phenyl)methyl)phenyl) benzenacetamide 1) A round 3000 ml 3-necked flask was equipped with a motor driven stirrer, N2 purge.

2) 154.42 g (0.9988 moles) of phenylacetyl chloride were added to the flask.

3) 140.43 g (0.9990 moles) of benzoyl chloride were added to the flask.

4) 0.75 L of anhydrous (water<0.005%) N-methyl pyrrolidone solvent were added to the flask.

5) N2 purging was started.

6) Stirring was started and the flask was warmed to approximately 70° C. by means of a heat gun.

7) Heating by means of the heat gun was stopped.

8) In small portions, 197.85 g (0.9979 moles) of methylene dianiline were added to the flask over approximately 30 minutes.

9) 55 minutes after the completion of the methylene dianiline addition, a precipitate began coming out of the solution.

10) The flask was heated by means of a heat gun. When the solution temperature reached 56° C., all the precipitate had solubilized back into the solution. Heating was continued, and the temperature stabilized at 108° C.

11) 4 hours and 15 minutes after the MDA addition, the product was completely precipitated from solution by adding 1 L of water to the flask from an addition funnel over 15 minutes. The precipitate formed fine particles.

12) In order to neutralize the HCl that was generated during the reaction, a total of 112.05 g of potassium hydroxide were added to the flask in small portions.

13) 5 drops of Palmolive brand liquid dish detergent were added to the flask.

14) The hot slurry was poured from the flask into a 3-liter vacuum filter equipped with medium grade filter paper, and the N-methyl pyrrolidone/water mixture was drawn off by vacuum filtration.

15) The product was washed/vacuum filtered with 6×2 L of boiling water.

16) The filter cake of the product was coarsely dried overnight in an oven at 90° C.

17) The product was then completely dried in a vacuum oven at 70° C. for overnight.

18) 398.18 g (0.9480 moles) of product were recovered in the form of a fine, white powder.

Example 1
Preparation of Block-copolymer/Solid Solvent Blends

OBA, (98%, Aldrich Catalog No. 41,183-3) and DPA, MPC, MPA, MPB, MPBA and BPC (all prepared as above) were compounded into Estane 58661, a polyester-polyurethane block copolymer from B.F. Goodrich, Morthane PE90-203, a polyether-polyurethane block copolymer from Morton International, and Hytrel 4056, a polyester-polyether block copolymer from Dupont, at various concentration levels by means of a laboratory-scale 2-roll mill. More specifically, pellets of the selected block copolymer were poured into the nip of the mill rolls, in order to form a sheet. Powder of the selected solid solvent additive was then sprinkled onto the block-copolymer sheet. The sheet was folded in half, and run through the mill rolls. The sprinkling of powder onto the sheet, followed by milling was repeated until the desired amount of additive was incorporated into the block copolymer. The folding of the block-copolymer/additive sheet followed by running through the mill rolls was continued even after the additive addition was complete to ensure that the additive was evenly dispersed through the block copolymer. Eveness of dispersion was determined visually. Table 1 shows the composition of blends.

reduction resulted was proportionally greater than any potential tensile strength reduction, the tensile strength/viscosity ratio normalized to the base adhesive was calculated according to this previously discussed formula:

$$\text{Normalized } TS/Visc \text{ Ratio} = \frac{(TS \text{ of resin with additive})}{(Visc \text{ of resin with additive})} \times \frac{(Visc \text{ base resin})}{(TS \text{ base resin})}$$

If the Normalized TS/Visc ratio is greater than 1, then the viscosity reduction is proportionally greater than any tensile strength reduction, which is desirable. Therefore, it would be anticipated that block copolymer/additive blends with a Normalized TS/Visc ratio of greater than 1 will show that the benefit of viscosity reduction outweighs any loss of tensile strength. This is conditional that the absolute tensile strength value, if it is reduced by the additive, remains higher than

TABLE 1

| Base Polymer Type | Base Polymer Trade Name | Grams of Polymer | Solid Solvent Additive | Grams of Additive | Add. Conc. Wt. % | Mill Temp. (° C.) |
|---|---|---|---|---|---|---|
| PESPETH | Hytrel 4056 | 52.53 | DPA | 2.77 | 5.0 | 23 |
| PESPETH | Hytrel 4056 | 56.61 | MPA | 2.95 | 5.0 | 23 |
| PESPETH | Hytrel 4056 | 49.56 | MPBA | 2.58 | 4.9 | 23 |
| PESPU | Estane 58661 | 499.29 | OBA | 26.28 | 5.0 | 70 |
| PESPU | Estane 58661 | 100.01 | OBA | 11.13 | 10.0 | 70 |
| PETHPU | Morthane PE90-203 | 483.73 | BPC | 25.44 | 5.0 | 95 |
| PETHPU | Morthane PE90-203 | 308.33 | DPA | 16.33 | 5.0 | 95 |
| PETHPU | Morthane PE90-203 | 272.20 | MPA | 5.69 | 2.0 | 95 |
| PETHPU | Morthane PE90-203 | 315.71 | MPB | 6.44 | 2.0 | 95 |
| PETHPU | Morthane PE90-203 | 775.21 | MPB | 40.83 | 5.0 | 95 |
| PETHPU | Morthane PE90-203 | 356.72 | MPB | 62.94 | 15.0 | 95 |
| PETHPU | Morthane PE90-203 | 322.25 | MPBA | 1.61 | 0.5 | 95 |
| PETHPU | Morthane PE90-203 | 1207.51 | MPBA | 24.65 | 2.0 | 95 |
| PETHPU | Morthane PE90-203 | 455.92 | MPC | 23.99 | 5.0 | 95 |
| PETHPU | Morthane PE90-203 | 103.82 | OBA | 11.54 | 10.0 | 125 |

PESPETH = Polyester-polyether block copolymer
PESPU = Polyester-polyurethane block copolymer
PETHPU = Polyether-polyurethane block copolymer Table 2 shows the tensile and viscosity properties of the various combinations of additive identities, additive concentration levels, and polymer types that were compounded in Table 1. Tensile strength and viscosity were measured as previously described. In order to determine if the viscosity reduction resulted was proportionally greater than any any required minimum tensile strength value in order to be suitable for the end use. Note that in the case of the Hytrel 4056 polyester-polyether block copolymer, surprisingly, the additives MPA and MPBA also functioned as strong reinforcing filters.

TABLE 2

| Base Polymer Type | Base Polymer Trade Name | Solid Solvent Additive | Add. Conc. Wt. % | Base Polymer Ten. Str. at R.T. (psi) | Ten. Str. w/Add. | Melt Temp. (C.) | Base Polymer Visc. (poise) | Visc. w/Add. (poise) | Norm. Ten. Str. to Visc. Ratio |
|---|---|---|---|---|---|---|---|---|---|
| PESPETH | Hytrel 4056 | DPA | 5.0 | 2834 | 2548 | 230 | 8078 | 5504 | 1.32 |
| PESPETH | Hytrel 4056 | MPA | 5.0 | 2834 | 4436 | 250 | 5708 | 4168 | 2.14 |
| PESPETH | Hytrel 4056 | MPBA | 4.9 | 2834 | 4513 | 230 | 8078 | 4646 | 2.77 |
| PESPU | Estane 58661 | OBA | 5.0 | 6646 | 6126 | 250 | 102 | 9.2 | 10.22 |
| PESPU | Estane 58661 | OBA | 10.0 | 6646 | 2164 | 250 | 102 | 6.0 | 5.54 |
| PETHPU | Morthane PE90-203 | BPC | 5.0 | 5837 | 5822 | 250 | 149 | 10 | 14.86 |
| PETHPU | Morthane PE90-203 | DPA | 5.0 | 5837 | 4779 | 250 | 149 | 58 | 2.10 |
| PETHPU | Morthane PE90-203 | MPA | 2.0 | 5837 | 5803 | 250 | 149 | 53 | 2.79 |
| PETHPU | Morthane PE90-203 | MPB | 2.0 | 5837 | 5211 | 190 | 11733 | 1422 | 7.37 |
| PETHPU | Morthane PE90-203 | MPB | 5.0 | 5837 | 5124 | 250 | 149 | 36 | 3.63 |
| PETHPU | Morthane PE90-203 | MPB | 15.0 | 5837 | 3027 | 250 | 149 | 5.0 | 15.45 |
| PETHPU | Morthane PE90-203 | MPBA | 0.5 | 5837 | 5308 | 250 | 149 | 76 | 1.78 |
| PETHPU | Morthane PE90-203 | MPBA | 2.0 | 5837 | 5866 | 250 | 149 | 67 | 2.23 |

TABLE 2-continued

| Base Polymer Type | Base Polymer Trade Name | Solid Solvent Additive | Add. Conc. Wt. % | Base Polymer Ten. Str. at R.T. (psi) | Ten. Str. w/Add. | Melt Temp. (C.) | Base Polymer Visc. (poise) | Visc. w/Add. (poise) | Norm. Ten. Str. to Visc. Ratio |
|---|---|---|---|---|---|---|---|---|---|
| PETHPU | Morthane PE90-203 | MPC | 5.0 | 5837 | 6020 | 250 | 149 | 18 | 8.54 |
| PETHPU | Morthane PE90-203 | OBA | 10.0 | 5837 | 4098 | 230 | 725 | 20 | 25.45 |

PESPETH = Polyester-polyether block copolymer
PESPU = Polyester-polyurethane block copolymer
PETHPU = Polyether-polyurethane block copolymer Example 2
Description of making seam tape MPB of Example C was compounded into Morthane PE90-203 according to the method described in Example 1. A number of small batches of MPB/Morthane PE90-203 blend were made. These small batches of block-copolymer/solid solvent additive blends were then granulated by means of a granulator equipped with a 3 mm sizing screen. The granules of all the small batches were then combined to form a master batch.

TABLE 3

| Mill Temp. 95 C. | | |
|---|---|---|
| Grams of Morthane PE90-203 | Grams of MPB Additive | Percent Additive |
| 775.21 | 40.83 | 5.00 |
| 426.28 | 22.37 | 4.99 |
| 442.38 | 23.38 | 5.02 |
| 429.63 | 22.62 | 5.00 |
| 437.04 | 22.98 | 5.00 |
| 486.05 | 25.58 | 5.00 |
| 408.83 | 23.22 | 5.37 |
| 411.62 | 21.70 | 5.01 |
| 462.24 | 24.27 | 4.99 |
| 318.96 | 16.74 | 4.99 |
| Total 4598.24 | Total 243.69 | Average 5.03 |

The block-copolymer/additive master-batch blend of Table 3 was dried overnight using a Una-Dyn UDC-30 air dryer at 200° F. to remove moisture absorbed from the air. It was then extruded by using a C.W. Brabender PL-2000 1¼" single-screw extruder having a 30:1 L/D ratio, and equipped with a 6" width Extrusion Dies Inc. film die. The extruder processing parameters for this example were zone 1=185° C., zone 2=195° C., zone 3=210° C.

The extrudate was applied to the waterproof-barrier side of a 2-layer fabric laminate at a nominal thickness of 0.006 inches, and taken up on a cardboard core. The composite roll was slit into one inch wide strips of seam sealing tape.

Seam tape with the adhesive layer consisting of only the Morthane PE90-203 base polymer (no MPB additive) was also made. Pellets as obtained from the manufacturer were dried overnight at 20® F. in the dryer, coated on the sealing backer at the same extrusion conditions mentioned above, and slit to 1" width.

Example 3
Sealing of Seam Tapes to Fabric Panels With Sewn Seams

The seam tapes made in Example 2 were conveyed through the hot-air sealing nip of a Series 5000E GORE-SEAM™ sealing machine (W. L. Gore & Associates, Inc.) and applied to a sewn seam between two fabric panels. The fabric panels were composed of a 3-layer laminate obtained from W. L. Gore & Associates, Inc. (part number 312858) and composed of an ePTFE membrane having adhered on one side a nylon-6,6 face fabric and on the other side a nylon-6,6 backer fabric. The hot-air sealing nip consists of a nozzle attached to the seam sealing machine at a hot air supply. The hot-air stream is discharged from the nozzle onto the seam sealing tape to heat the melt-processible adhesive on the sealing backer. The tape is then pressed into the sewn seam by a set of nip rollers.

For this example, the sealing machine was adjusted to have a hot air temperature of 800° C., a nozzle air pressure of 20 psig, and nip pressure of 80 psig.

The maximum sealing speed was evaluated on the seam tapes consisting of the MPB/Morthane PE90-203 blend and the Morthane PE90-203 base polymer alone. The maximum sealing speed means the maximum sealing speed the sealing machine can be operated at that will produce a completely waterproof seam. This is done by increasing the sealing speed while keeping the other sealing machine parameters constant and subjecting the sealed fabric panels to the Suter test.

The maximum sealing speed for the seam tape consisting of the base block copolymer was 19 fpm, while the seam tape consisting of the block-copolymer/additive blend had a maximum sealing speed of 35 fpm.

Example 4

A moisture-curing polyether-polyurethane block copolymer was prepared according to the method described in Example 1 of U.S. Pat. 4;532,316. The block copolymer prepared by this method contained an excess of isocyanate functionalities, which react with moisture to increase molecular weight.

2.48 g of BPC were milled into 45.87 g of the moisture-curing block copolymer at room temperature. Since the moisture-curing block copolymer was tacky to the touch, release paper was wrapped around the mill rolls and secured in place with tape. Otherwise, the milling procedure was the same as previously described.

The viscosity of the moisture-curing block-copolymer/BPC blend was immediately measured upon completion of the milling procedure. The viscosity of the base moisture-curing block-copolymer was also measured. The remainder of the blend and base block copolymer were placed in a high humidity chamber for 2 days, in order to bring about complete moisture cure. The cured block-copolymer/BPC blend and cured base block copolymer were then tested for tensile strength using the previously described method. Table 4 shows the tensile and viscosity properties. Note that BPC, surprisingly, also functioned as a strong reinforcing filler.

TABLE 4

| Base Polymer Type | Additive | Add. Conc. Wt. % | Cured Base Polymer Ten. Str. at R.T. (psi) | Cured Ten. Str. w/Add. | Melt Temp. (C.) | Non-Cured Base Polymer Visc. (poise) | Non-Cured Visc. w/Add. (poise) | Norm. Ten. Str. to Visc. Ratio |
|---|---|---|---|---|---|---|---|---|
| MCPETHPU | BPC | 5.1 | 4342 | 5619 | 250 | 22 | 9.4 | 3.04 |

MCPETHPU = Moisture-curing polyether-polyurethane

For convenience in teaching this invention, especially with respect to ease of preparation of specimens for measuring tensile strength, the moisture-curing block copolymer of this example was chosen to yield a melt-processable product in the cured state. This should be recognized as not to be limiting in the scope or spirit of the invention. As will be apparent to those skilled in the art, reactive functionalities (e.g. isocyanates with a functionality≧2) may be incorporated into the base block copolymer to tailor the various desired properties, such as compression set, of the final product. When using such block copolymers, the non-cured block-copolymer/additive blends of this invention are melt processable. However, the final product, after curing, may be thermally intractable.

We claim:

1. A melt-processible composition comprising:
   a) a block copolymer, and
   b) 0.2 to 20 weight percent solid solvent based on a total weight of a) and b) of a compound having:
      i) a molecular weight of 600 or less, and
      ii) having at least two functional groups selected from amide or carbamate groups, and
      iii) having at least two aromatic rings.

2. The composition of claim 1 having a Normalized Tensile Strength/Viscosity ratio of 1 or more.

3. The composition of claim 1 having a Normalized Tensile Strength/Viscosity ratio of 1.3 or more.

4. The composition of claim 1 having a Normalized Tensile Strength/Viscosity ratio of 2 or more.

5. The composition of claim 1 having a Normalized Tensile Strength/Viscosity ratio of 5 or more.

6. The composition of claim 1 wherein the weight percent solid solvent is 0.2 to 5 weight percent.

7. The composition of claim 1 wherein the weight percent solid solvent is 0.5 to 2 weight percent.

8. The composition of claim 1 or 2 wherein the solid solvent is selected from an adipamide, bisacetamide, biscarbamate, or dibenzamide.

9. The composition of a claim 1 wherein the solid solvent has the formula:

$$R''-X-R''-X-R'''$$

wherein:

R'' and R''' can be the same or different and are selected from alkyl of 1–6 carbons or phenyl, each X is the same and is selected from divalent amide or divalent carbamate;

R' is alkylene of 1–6 carbons, methylene diphenylene or oxydiphenylene,

And when R'' or R''' is alkyl, R' is oxydiphenylene or methylene diphenylene.

10. The composition of claim 1 wherein the block copolymer is a polyester-polyether, a polyester-polyurethane, polyether-polyurethane, polyamide-polyether, or a polyamide-polyester.

11. The composition of claim 9 wherein the block copolymer is a polyester-polyether, a polyester-polyurethane, polyether-polyurethane, polyamide-polyether, or a polyamide-polyester.

12. The composition of claims 1, 10, or 11 where the solid solvent is selected from the class consisting of

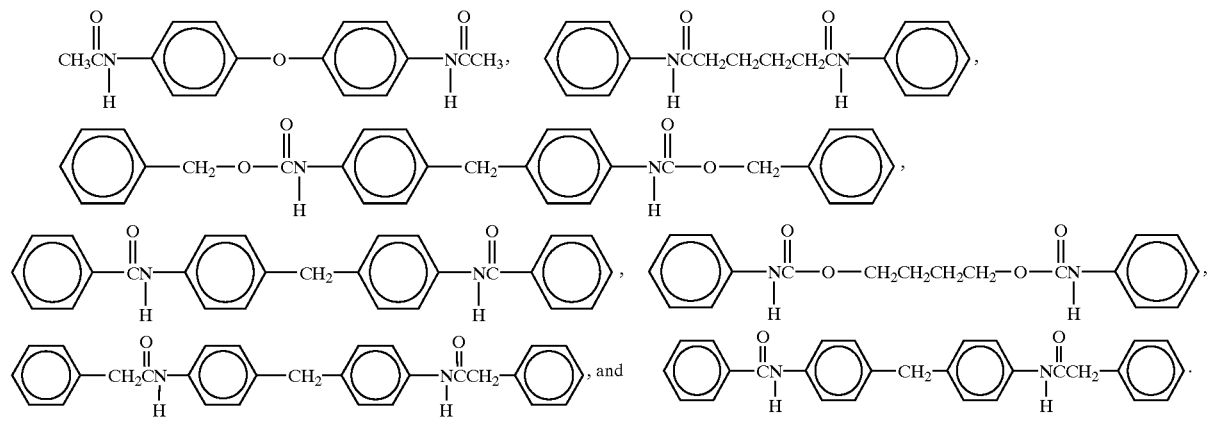

13. The composition of claim 1 wherein the weight percent solid solvent is 0.2 to 5 weight percent, and the composition has a normalized tensile strength/viscosity ratio of 1 or more.

14. The composition of claim 11 wherein the weight percent solid solvent is 0.2 to 5 weight percent, and the composition has a normalized tensile strength/viscosity ratio of 1 or more.

15. The composition of claim 13 wherein the block copolymer is a polyester-polyether, a polyester-polyurethane, polyether-polyurethane, polyamide-polyether, or a polyamide-polyester.

16. The composition of claim 12 wherein the weight percent solid solvent is 0.2 to 5 weight percent and the composition has a normalized tensile strength/viscosity ratio of 1 or more.

* * * * *